United States Patent [19]

Ohmori et al.

[11] Patent Number: 4,690,869

[45] Date of Patent: Sep. 1, 1987

[54] TRANSPARENT COATING MATERIAL

[75] Inventors: Akira Ohmori; Kazuo Ishiwari, both of Ibaraki, Japan

[73] Assignee: Daikin Kogyo Co., Ltd., Osaka, Japan

[21] Appl. No.: 821,519

[22] Filed: Jan. 23, 1986

Related U.S. Application Data

[62] Division of Ser. No. 708,446, Mar. 5, 1985, abandoned.

[30] Foreign Application Priority Data

Mar. 9, 1984 [JP] Japan ................... 59-46183

[51] Int. Cl.$^4$ .............................................. C08F 20/24
[52] U.S. Cl. ...................................... 428/421; 526/245
[58] Field of Search ........................ 526/245; 428/421

[56] References Cited

U.S. PATENT DOCUMENTS

| | | | |
|---|---|---|---|
| 2,628,958 | 2/1953 | Bittles | 526/245 |
| 3,277,039 | 10/1966 | Marascia et al. | 526/245 |
| 3,282,905 | 11/1966 | Fasick et al. | 526/245 |
| 3,384,627 | 5/1968 | Anello et al. | 526/245 |
| 3,459,696 | 5/1969 | Read | 526/245 |
| 3,532,659 | 10/1970 | Hager et al. | 526/245 |
| 3,637,614 | 1/1972 | Greenwood | 526/245 |
| 3,808,179 | 4/1974 | Gaylord | 526/245 |
| 3,919,183 | 11/1975 | Jager et al. | 526/245 |
| 4,130,706 | 12/1978 | Plambeck | 526/245 |
| 4,259,407 | 3/1981 | Tada | 526/245 |
| 4,345,057 | 8/1982 | Yamabe et al. | |
| 4,500,694 | 2/1985 | Ohmori et al. | 526/245 |

*Primary Examiner*—Paul R. Michl
*Attorney, Agent, or Firm*—Larson and Taylor

[57] ABSTRACT

A transparent coating material comprises a polymer which contains at least 50 wt. % of a structural unit represented by the formula

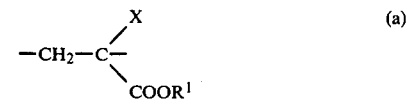

wherein X is fluorine or alkyl having 1 to 6 carbon atoms, and $R^1$ is fluoroalkyl.

5 Claims, No Drawings

TRANSPARENT COATING MATERIAL

This application is a division, of application Ser. No. 06/708,446 filed Mar. 5, 1985, now abandoned.

The present invention relates to a transparent coating material having outstanding resistance to weather and water.

Polymethyl methacrylate is well known as a transparent material for coating surface finishing materials and packaging materials. However, polymethyl methacrylate heretofore used has poor water resistance and insufficient weather resistance. For example, when a surface finishing material or the like coated with polymethyl methacrylate is allowed to stand outdoors, the polymethyl methacrylate starts to gradually decompose, possibly developing fine cracks, with the result that the coating material deteriorates to seriously impair the appearance of the substrate material.

An object of the present invention is to provide a transparent coating material which is excellent in resistance to weather and water.

More specifically, the present invention provides a transparent coating material comprising a polymer which contains at least 50 wt. % of a structural unit represented by the formula

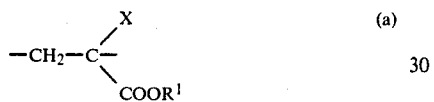

(a)

wherein X is fluorine or alkyl having 1 to 6 carbon atoms, and $R^1$ is fluoroalkyl.

Preferably, the fluoroalkyl group $R^1$ contained in the structural unit (a) has 2 to 10 carbon atoms.

It is required that the polymer contain at least 50 wt. % of the structural unit (a) to give satisfactory resistance to weather and water to the transparent coating material comprising the polymer.

Usually, the polymer, which contains at least 50 wt. % of the structural unit (a), may further contain a structural unit represented by the formula

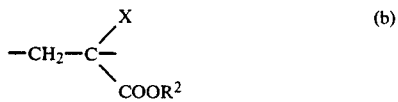

(b)

wherein X is as defined above, and $R^2$ is alkyl having 1 to 20 carbon atoms, and a structural unit represented by the formula

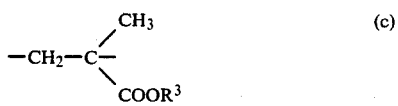

(c)

wherein $R^3$ is hydrogen or $-(CH_2)_n Y$ wherein Y is —OH or

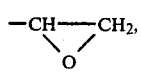

and n is an integer of 1 to 5. The structural units (b) and (c) may be present singly or in combination. When present, usually 20 to 50 wt. % of the structural unit (b) and 0 to 30 wt. % of the structural unit (c) are contained in the polymer.

The structural unit (c), which contains a functional group, can be reacted with a crosslinking agent, whereby the polymer can be crosslinked to give improved mechanical strength to the coating material.

The polymer containing a structural unit (a) or containing a structural unit (b) and/or a structural unit (c) in addition to the unit (a) can be prepared usually by polymerizing a monomer represented by the formula

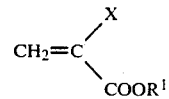

wherein X and $R^1$ are as defined above, or by polymerizing this monomer with at least one of a monomer represented by the formula

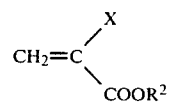

wherein X and $R^2$ are as defined above, and a monomer represented by the formula

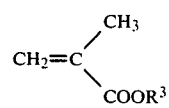

wherein $R^3$ is as defined above.

Other ethylenically unsaturated monomers may be copolymerized with the above monomer(s) insofar as the desired properties of the coating material are not impaired.

The polymer is prepared usually by solution, suspension, emulsion or block polymerization.

The polymerization temperature is usually 0° to 150° C. and the reaction pressure is 0.5 to 5 kg/cm²G when any of these polymerization methods is resorted to.

Examples of media useful for suspension polymerization are water, 1,1,2-trichloro-1,2,2-trifluoroethane and 1,2-dichloro-1,1,2,2-tetrafluoroethane, which may be used singly or in admixture. Examples of media useful for solution polymerization are methyl ethyl ketone, ethyl acetate, butyl acetate, etc. Useful polymerization initiators for emulsion polymerization are redox initiators comprising oxidizing agents such as ammonium persulfate, reducing agents such as sodium sulfite and a salt of transition metal such as ferrous sulfate. Initiators useful for suspension or solution polymerization are azo compounds and organic peroxides such as azobisisobutyronitrile, isobutyryl peroxide, octanoyl peroxide, etc.

Examples of useful emulsifiers for emulsion polymerization are ammonium salts, sodium salts and the like of perfluorocarboxylic acid, ω-hydroperfluorocarboxylic acid, etc.

Examples of useful crosslinking agents which react with the functional group of the structural unit (c) to crosslink the polymer are Lewis acid compounds, amino compounds, amide compounds, imino compounds, epoxy compounds, isocyanate compounds, carboxylic anhydrides and the like. Usually used are isocyanate compounds such as hexamethylene diisocyanate trimer, tolylene diisocyanate and the like. Such crosslinking agent is thoroughly mixed with the polymer having a functional group for crosslinking reaction, which is conducted usually at 10° to 150° C., preferably at room temperature.

The polymer obtained by the foregoing polymerization process and useful for the present invention has a molecular weight ranging from about 10,000 to about 1,000,000, preferably about 10,000 to about 200,000, as measured by gel permeation chromatography using polystyrene as a standard, light transmittance of more than 80% when a sheet of 2 mm in thickness is tested with the use of a light having a wavelength of 600 nm, and a softening point of about 50° to about 130° C.

The coating material of the present invention, because of its stable transparency, is advantageously usable for coating various articles such as furniture, machines, devices, buildings and structures including bridges and also for preparing laminates in combination with sheets of polycarbonate, polystyrene, polyethylene, polyester, polyvinyl chloride, etc. Such laminates are useful as soundproof panels, solar collector films, agricultural films, packaging materials for pharmaceuticals and food, etc.

Examples of the invention and comparison examples are given below.

EXAMPLES 1-6 AND COMPARISON EXAMPLE 1

Into a 2-liter four-necked flask were placed 100 parts by weight of the monomer or monomers (combined amount) listed in Table 1, 1 part by weight of azobisisobutyronitrile and 500 parts by weight of ethyl acetate, and the resulting solution was maintained at 60° C. for 5 hours with stirring for polymerization. The reaction mixture was then sprayed onto a transparent plastics panel, having a thickness of 1 mm and listed in Table 1, and dried at room temperature for 24 hours.

The specimen was tested for the properties listed in Table 1. The coating formed as above was found to have a thickness of 100 to 120 μm by cutting the specimen and microscopically observing the section.

EXAMPLE 7

The monomers given in Table 1 were polymerized in the same manner as above, and the reaction mixture was added dropwise to petroleum ether, whereupon a polymer precipitated. The polymer was collected and dried at a reduced pressure of 20 mm Hg at 80° C. for 16 hours. Subsequently, the polymer was made into a thin film, 0.5 mm in thickness, by a heat press heated at 230° C. The film was laminated to each side of a 1-mm-thick panel of polycarbonate with a polybutyl acrylate adhesive 0.6 dl/g in [η] value (at 35° C.) to obtain a test specimen, which was then tested with the results shown Table 1.

As listed in Table 1, the specimen was tested for 60° specular gloss and light transmittance (i) immediately after preparation and (ii) after having been subjected to repeated rainfall cycles of 18 min/120 min for 2000 hours in a superlong-life carbon arc weather-meter (product of Suga Tester Co., Ltd.). The test methods are as follows.

60° Specular gloss : JIS K 5400 6.7

Light transmittance : at a wavelength of 600 nm, using a spectrophotometer, Model 556, product of Hitachi, Ltd.

The symbols listed represent the following monomers.

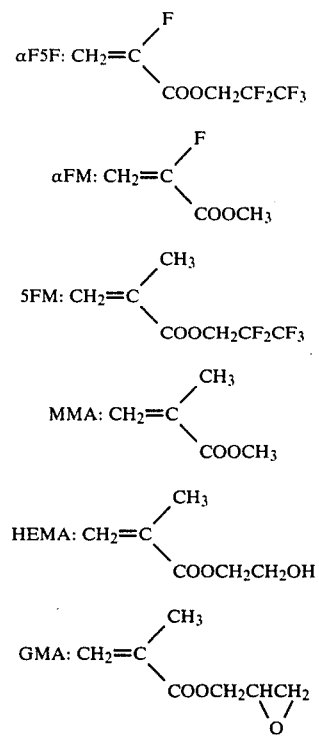

TABLE 1

|  | Monomer (parts by weight) | Substrate panel material | 60° Specular gloss (%) As prepared | 60° Specular gloss (%) In 2000 hrs. | Light transmittance (%) As prepared | Light transmittance (%) In 2000 hrs. | Molecular weight |
|---|---|---|---|---|---|---|---|
| Ex. 1 | αF5F (70) and MMA (30) | Polycarbonate | 87 | 78 | 92 | 82 | 340,000 |
| Ex. 2 | αFM (70) and 5FM (30) | Polycarbonate | 83 | 71 | 90 | 84 | 520,000 |
| Ex. 3 | αF5F (70) and 5FM (30) | Polycarbonate | 78 | 76 | 87 | 81 | 110,000 |
| Ex. 4 | αF5F (100) | Polycarbonate | 72 | 66 | 88 | 85 | 260,000 |
| Ex. 5 | 5FM (100) | Polycarbonate | 80 | 71 | 78 | 76 | 80,000 |
| Comp. Ex. 1 | MMA (100) | Polycarbonate | 88 | 31 | 92 | 64 | 120,000 |
| Ex. 6 | αF5F (70) and MMA (30) | Polystyrene | 81 | 72 | 72 | 60 | 340,000 |
| Ex. 7 | αF5F (70) and | Poly- | 88 | 64 | 85 | 72 | 340,000 |

TABLE 1-continued

| Monomer (parts by weight) | Substrate panel material | 60° Specular gloss (%) As prepared | 60° Specular gloss (%) In 2000 hrs. | Light transmittance (%) As prepared | Light transmittance (%) In 2000 hrs. |
|---|---|---|---|---|---|
| MMA (30) | carbonate | | | | |

EXAMPLES 8 AND 9

Polymerization was carried out in the same manner as in Example 1 with the exception of using 100 parts by weight of the monomer or monomers (combined amount) listed in Table 2. The reaction mixture obtained was sprayed onto aluminum panels and dried at room temperature for 24 hours. The specimens prepared were subjected to the tests given in Table 2. The coating had a thickness of 10 to 30 μm as measured by the same method as in Example 1.

EXAMPLES 10-12 AND COMPARISON EXAMPLE 2

Polymerization was carried out in the same manner as in Example 1 except that the monomers listed in Table 2 were used in a combined amount of 100 parts by weight. Hexamethylenediisocyanate trimer (2.5 parts by weight) was admixed with 100 parts by weight of the reaction mixture, followed by thorough mixing. The resulting mixture was sprayed onto aluminum panels in the same manner as above and then allowed to stand at room temperature for 1 week to crosslink the polymer. The specimens prepared were subjected to the tests given in Table 2.

EXAMPLE 13

Polymerization was conducted in the same manner as in Example 10 except that the monomers listed in Table 2 were used in a combined amount of 100 parts by weight. Diethylenetriamine (0.25 part by weight) was admixed with 100 parts by weight of the resulting reaction mixture, followed by the same procedure as in Example 12 to prepare specimens, which were similarly tested with the results given in Table 2.

The 60° specular gloss listed in Table 2 was measured by the same method as already stated. The pencil scratch test and cross-cut test were conducted according to JIS K 5400 6.14 and 6.15.

TABLE 2

| | Monomer (parts by weight) | 60° Specular gloss (%) As prepared | 60° Specular gloss (%) In 2000 hrs. | Pencil scratch test | Cross-cut test (%) | Molecular weight |
|---|---|---|---|---|---|---|
| Ex. 8 | αF5F (100) | 76 | 70 | H | 6 | |
| Ex. 9 | αF5F (50) and MMA (50) | 91 | 76 | 2H | 8 | |
| Ex.10 | αF5F (85), MMA (5) and HEMA (10) | 84 | 70 | H | 10 | |
| Ex.11 | αFM (70), 5FM (20) and HEMA (10) | 78 | 64 | H | 10 | |
| Ex.12 | αF5F (70), MMA (20) and HEMA (10) | 86 | 68 | 2H | 10 | |
| Ex.13 | αFM (70), 5FM (20) and GMA (10) | 70 | 60 | F | 10 | |
| Comp. | MMA (90) and HEMA (10) | 82 | 34 | 2H | 6 | |
| Ex. 2 | | | | | | |

We claim:

1. In a method of coating an article with a transparent coating material having outstanding resistance to weather and water, said article being selected from the group consisting of furniture, a machine, a building and a fixed structure, the improvement wherein said coating material comprises a polymer which contains at least 50 wt. % of a structural unit represented by the formula

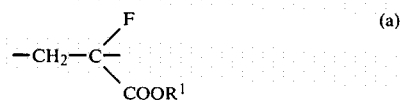 (a)

wherein $R^1$ is fluroalkyl having 2 to 10 carbon atoms, the light transmittance of said coating material being more than 80% when a sheet of 2 mm in thickness is tested with the use of a light having a wavelength of 600 mm.

2. A method according to claim 1 wherein said polymer has a softening point of about 50° to 130° C.

3. A method according to claim 1 wherein said polymer contains 20 to 50 wt. % of a further structural unit represented by the formula

 (b)

wherein $R^2$ is alkyl having 1 to 20 carbon atoms.

4. A method according to claim 1 wherein said polymer contains up to 30 wt. % of a further structural unit represented by the formula

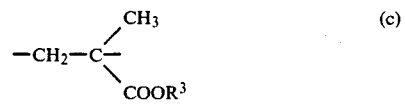 (c)

wherein $R^3$ is hydrogen or $-(CH_2)_n$ Y wherein Y is —OH or —CH—CH$_2$, and n is an integer of 1 to 5.

5. A method according to claim 1 wherein said polymer contains up to 30 wt. % of a further structural unit represented by the formula

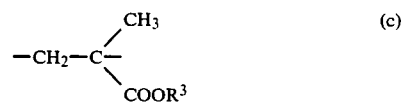 (c)

wherein $R^3$ is hydrogen or $-(CH_2)_n$ Y wherein Y is —OH or $$-CH\underset{O}{\overset{}{\diagup}}CH_2,$$

and n is an integer of 1 to 5.

* * * * *